Jan. 24, 1956  R. W. STINEMAN  2,732,507
PROTECTIVE APPARATUS FOR POWER SYSTEMS HAVING
ALTERNATORS OPERATING IN PARALLEL
Filed March 21, 1952  3 Sheets-Sheet 1

INVENTOR.
RUSSELL W. STINEMAN
BY
Reynolds, Beach & Christensen
ATTORNEYS

# United States Patent Office 2,732,507
Patented Jan. 24, 1956

2,732,507

PROTECTIVE APPARATUS FOR POWER SYSTEMS HAVING ALTERNATORS OPERATING IN PARALLEL

Russell W. Stineman, Seattle, Wash., assignor to Boeing Airplane Company, Seattle, Wash., a corporation of Delaware Application March 21, 1952, Serial No. 277,762

23 Claims. (Cl. 307—57)

This invention relates to protective apparatus for electric power generating and distribution systems and is intended more particularly for such systems having two or more alternators operating in parallel under the control of voltage regulators coordinated in their operation by an equalizer circuit.

The parallel operation of two or more alternators in a regulated power generating and distribution system gives rise to certain problems of protecting the equipment while providing continuity of service if possible in the face of various fault conditions that may occur. The problem of satisfying these protective and continuity requirements is particularly great in airplane power systems or the like, wherein the stringency of weight, size, available space, accessibility for maintenance, and other requirements must be heavily considered along with the purely functional requirements of the protective apparatus. The invention is herein illustratively described by reference to its application in an existing type of airplane power generating and distributing system for which it is well suited, but it should be understood that certain modifications and variations therein may be made both as to details of implementation and as to the practical application of the inventive principles, without departing from the underlying features of the invention involved.

In the particular system upon which the present description is based for purposes of illustrating a preferred application of the invention, a plurality of (four) three-phase alternators are connected for parallel operation. These alternators are driven by suitable prime movers, such as air turbines, and are normally held in synchronism by flow of circulating currents between them. Each of the four alternators in the system delivers load current through its own separate feeder bus network. The four feeder bus networks are interconnected by a main bus network to form a unitary system. Each feeder bus network normally has a separate block of load connected directly to it, and preferably of a size approximating the size of the loads connected to the respective feeder bus networks of the other alternators if the alternators be of equal rating, or proportional to their respective ratings if they differ. In order to achieve maximum rated capacity the three phases of the feeder bus networks are loaded as nearly equally as possible. The several feeder bus networks are connected to the terminals of their respective alternators through individual alternator circuit breakers, and to the main bus network through main bus tie circuit breakers.

The field exciter of each alternator is controlled by a separate voltage regulator connected to sense variations in the three-phase voltage generated by the particular alternator. An equalizing circuit interconnects all the voltage regulators and tends to equalize the reactive current of each alternator with the average or mean reactive current of all the system alternators. The amounts of real current delivered by the different alternators are determined, of course, primarily by the speed-load characteristics of their respective prime movers, as desired.

An exciter protection relay provided for each alternator is intended to trip it off the line when fault conditions develop causing gross over-excitation of its alternator's field.

In such a system it is found that a break in the sensing circuit of a voltage regulator, or in the control coil circuit of the regulator causes over-excitation of and excessive current in the particular alternator, and, as a proximate result thereof, under-excitation of the other alternators. This results from the action of all the voltage regulators attempting to maintain a constant voltage in the system. The equalizer circuit senses the resulting unbalance between the reactive currents of the alternators and partially counteracts it by partially overriding the tendency of the voltage regulators to respond to alternator voltage alone. In so doing, however, the equalizer action raises the system voltage and thereby endangers the alternators and load elements. Under certain conditions, especially if the load presents a high power factor, the excitation of the under-excited alternators may drop so low, despite the equalizer action, that they pull out of synchronism, and the entire system then degenerates or is subjected to violently fluctuating currents or voltages. If in this situation loss of synchronism is prevented because of the saliency effect of salient pole alternators, the voltage regulators of the under-excited alternators may lose control, resulting in a sharp rise of system voltage. The exciter protection relay of the over-excited alternator in all of the situations mentioned may or may not provide the necessary protection against loss of synchronism by disconnecting the over-excited alternator from the line, depending upon the load, the location of the circuit break in the defective regulator, and upon whether or not the under-excited alternators have pulled out of synchronism before such relay has time (several seconds, more or less) to operate. Even if the particular exciter protection relay does operate, it usually does not do so quickly enough to prevent a dangerous condition of overvoltage and high reactive currents in the system.

While it was mentioned above that the equalizer circuit tends to minimize the unbalance effects caused by a faulty voltage regulator, the equalizer design itself is a matter of compromise. If its action is overly powerful, for instance, its counteracting effect in the event of a voltage regulator fault would be to prevent loss of synchronism of the alternators, but in so doing it would raise the system voltage so high as to be potentially destructive to the alternator and possibly to the load elements as well. On the other hand, if the equalizer is reduced in its power or effectiveness by employing smaller and weaker sensing coils therein, then while system voltage will not be so greatly increased when a voltage regulator fault occurs, still loss of synchronism of the under-excited alternators will be more likely to occur. Moreover, the weaker the equalizer the less effective it can be during normal system operation for equalizing the reactive loads of the different alternators, which is the main purpose of the equalizer circuit. Of course, an open circuit in the equalizer loop itself leaves the system without any protection against excessive unbalance of reactive loads during otherwise trouble-free operation in the system, whereas in the case of a faulty voltage regulator loss of synchronism of the under-excited alternators would immediately occur under certain conditions.

An overly powerful equalizer also has the disadvantage of hindering or preventing the clearance of a main bus fault in the system. Thus if phase three of a feeder bus network is shorted to ground, the phase-three central bus tie limiter, i. e. that between the fault and the main bus, is the first to blow. In order for the fault to be cleared thereafter, it is necessary for the isolated third phase limiter between the fault and the impaired alternator to blow out. This is prevented by the equalizer circuit, however, which senses the increased current in the faulted third-phase line and reduces the excitation of the affected alternator. This leaves the third phase heavily overloaded, but not sufficiently so to blow the limiter. The overload current may then flow until the affected alternator is permanently damaged or until the condition is detected by an operator and the alternator circuit breaker is tripped manually. Normal operation of impaired load elements is interrupted until they are transferred to another alternator. Meanwhile the exciter protection relay of the impaired alternator will not operate because the alternator is not over-excited but is under-excited at the time. Moreover, the dangerous potentialities of the situation are aggravated by the fact that the faulted alternator is still paralleled with the remainder of the system through two phases.

A broad object of the present invention is to achieve a general solution to the foregoing difficulties, and to implement that solution by apparatus which does not otherwise detract from the effectiveness of the voltage regulators or the equalizer circuit under normal conditions, and further, which adds comparatively little to the total weight and complexity of a complete system.

A specific object is protective apparatus of the type indicated capable of utilizing existing equalizer circuit components for sensing and acting upon the effects of system faults as those discussed above.

Another object of the invention is versatile protective apparatus having a basic form which may readily be varied in simple ways to achieve different protective control action, that is, to sense different types of fault conditions and provide corresponding remedial action for each.

A particular object of the invention is multiple protective apparatus associated with individual alternators in a multiple-alternator system, each protective unit of the apparatus being capable of sensing when its associated alternator is delivering materially more than its share of the total lagging reactive current in the system, and of operating upon the basis thereof automatically to disconnect the remainder of the system from the alternator, including its feeder network and immediate load connected directly to such network.

Still another object of the invention is protective apparatus, each unit of which, by a minor rearrangement of connecting leads from the arrangement alluded to above for detecting differential lagging reactive currents in excess of a predetermined amount, is capable of detecting the condition wherein its associated alternator delivers materially less than its share of real power into the system. Still other abnormal conditions may be detected and acted upon by the protective apparatus by employing still different rearrangements of the connecting leads therein, as will hereinafter more fully appear.

The equalizer circuit referred to in connection with the described system comprises four current transformers, series-connected in an endless loop, such transformers being magnetically linked with corresponding phase conductors of the different alternators. The primaries of four separate equalizer transformers, respectively arranged for controlling the four different voltage regulators, are connected across the respective current transformer windings so as to be included in the equalizer loop. The arrangement is such that the equalizer circuit supplies the voltage regulator of each alternator with a control voltage that is proportional to the difference between lagging reactive current of its alternator and the average lagging reactive current of all the alternators in the system. In this way equalization of alternator reactive currents is achieved in the system during normal operating conditions.

The protective apparatus of the present invention, when added to the above system as herein illustratively described, comprises, for each alternator, a voltage comparison circuit wherein alternator three-phase voltage is effectively balanced against a separately derived voltage added to the same three-phase voltage. The separately derived voltage in each comparison circuit is obtained from the secondary of a particular sensing transformer of several of the same, there being one such transformer for each alternator, having its primary connected directly in series with that of the associated voltage regulator equalizer transformer and thereby in parallel with the associated current transformer, such that, in the chief application of the invention, the separately derived voltage is proportional to the vector difference between the reactive current of the particular alternator and the average of the reactive currents of all the alternators in the system. Moreover, the phase connections in each voltage comparison circuit are such that the aforementioned balancing of voltages therein produces a resultant control voltage which trips out the bus tie breaker of the particular alternator if the lagging reactive current of such alternator materially exceeds the average lagging reactive current of all the alternators. In its tripped position, the open bus tie breaker provides a by-pass or short-circuit connection around that portion of the equalizer loop comprising the three transformers associated with the affected alternator, so that the equalizer circuit cannot transmit the abnormal condition to the remaining alternator voltage regulators.

The system is thus provided with protective apparatus that isolates from the remainder of the system any alternator, along with its feeder bus network and immediate load, that carries more than its share of lagging reactive current, so that if the particular alternator itself continues to operate satisfactorily alone, there will be no interruption of service performed by its various out immediate load elements, while the remaining alternators of the system will continue to operate in a regulated system normally without it. The result, in terms of the former protective control difficulties described at the outset, is that the isolation of the affected alternator circuit from the remainder of the system by opening of the particular bus tie breaker avoids loss of synchronism of the remaining alternators and prevents excessive voltage rise in the entire system under the described circumstances. Moreover, in the event the equalizer loop itself becomes broken, the system will automatically be divided into isolated units such that harmful interactions between the alternators cannot occur. The protective apparatus which the invention adds to such a system also eliminates the described difficulty occurring as a result of a third-phase fault. This it does automatically by sensing the large current fed into the fault and acting upon it to trip out the associated bus tie circuit breaker in all three phases, which shorts out the impaired alternator's equalizer loop elements and permits the alternator to go to ceiling excitation, either clearing the fault or causing the particular alternator's exciter protection relay to operate if the fault does not burn away within a predetermined time, safe for the alternator.

Preferably the system is additionally provided with over-voltage relays for tripping out any individual alternator's circuit breaker in the event, and only in the event, the bus tie circuit breaker of the particular alternator is already tripped by the protective apparatus and a condition of over-voltage in the particular alternator circuit exists or develops, such that continued operation thereof would be likely to damage the alternator or the load devices energized by it.

The voltage comparison circuits of the instant protective apparatus could be controlled by "separately derived voltages" previously mentioned which are produced from a separate loop circuit similar to but distinct from the existing equalizer circuit coordinating the action of the voltage regulators. However, it is preferred for several reasons to derive this voltage in each case from a sensing transformer that is connected directly in the existing equalizer loop or circuit. In the first place, it enables the protective apparatus to act upon reactive load unbalance between the different alternators caused by an open or faulty equalizer loop as previously described. Secondly, it avoids the vulnerability of an additional control loop under military conditions. Thirdly, it avoids the possibility of false tripping of the bus tie circuit breakers resulting from the additional loop. Finally, it obviously reduces the cost and complexity of the system, by having existing components serve multiple duty.

The application of three-phase voltage of the individual alternators to their respective voltage comparison circuits is preferred to a possible modified arrangement in which a single-phase voltage is used, it being noted that both possibilities, among various other feasible modifications, are within the scope of the invention. The reason for this particular preference is that the occurrence of a temporary fault in one of the networks will not cause the three-phase voltage to increase appreciably—in fact, it may even drop slightly—thereby allowing time for the fault to be cleared before the over-voltage relay of the particular alternator operates and trips out the individual alternator's circuit breaker. In those cases, even though the particular alternator is isolated from the remainder of the system by tripping of its bus tie breaker, it is nevertheless enabled to continue the service of its load elements after the fault clears. However, if, instead of three-phase voltages applied to the voltage comparison circuits, they are energized by single phase voltages, the occurrence of a fault may cause that voltage to rise so high as to trip the over-voltage relay even before the most temporary of faults could be cleared from the line.

As stated, the protective apparatus of the present invention is intended chiefly for use as a differential lagging reactive current protection device which comprises, in association with each individual alternator of a multiple alternator system, a voltage comparison circuit arranged to trip out the bus tie circuit breaker of an alternator delivering more than its share of lagging reactive current, which is a condition symptomatic of the various difficulties mentioned above. The system discriminates between lagging reactive current and leading reactive currents, hence does not isolate an alternator under normal, if unusual, operating conditions. By revising the phase connections of certain portions of the voltage comparison circuit in simple manner, the protective apparatus may be arranged to act upon a condition wherein any alternator delivers either more than its share of lagging reactive current or less than its share of real or unity-power-factor current. Thus the protective apparatus becomes of value in detecting the condition of failure of the prime mover of any alternator in the system. These and still other revisions in the protective apparatus circuit connections may be made in order to respond to any combination of excessive or insufficient real and reactive currents.

These and other features, objects and advantages of the invention will become more fully evident from the following description of the illustrative form thereof by reference to the accompanying drawings.

Figure 1:
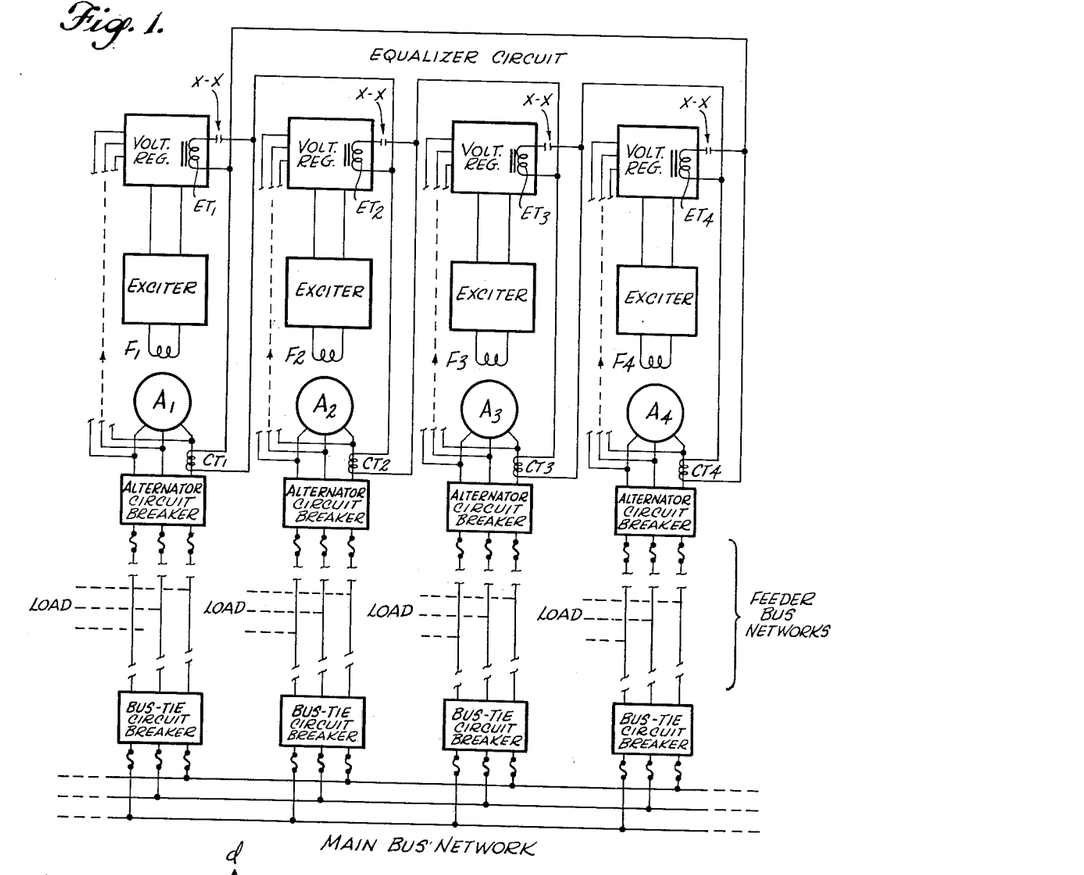
Figure 1 is a simplified schematic diagram of the regulated four-alternator system upon which the description of the present invention is based.

In Figure 1 the four three-phase alternators are respectively designated A1, A2, A3 and A4. Each alternator delivers three-phase load current to its individual feeder bus network through an alternator limiter and circuit breaker individual to that alternator, and the four feeder bus networks are interconnected through individual bus tie breakers by a main bus network, all as illustrated schematically in the figure. Each feeder bus network has a block of load connected directly to it as indicated. In the usual system the bus tie limiters are designed to blow in advance of the alternator limiters in the event a fault occurs in other alternator circuits, in the main bus network, or in the latter's connections to the bus tie limiters, whereby the isolated alternator is thereafter permitted to operate independently if other conditions so permit.

The field windings F1, F2, F3 and F4 for the correspondingly numbered alternators are energized by separate exciters which in turn are controlled by individual voltage regulators as shown in the figure. Exciter protection relays (not shown) protectively open the respective alternator field circuits in the event of persistent exciter overload. An equalizer circuit is provided for coordinating the action of the voltage regulators in order substantially to equalize the reactive load carried by the several alternators. This equalizer circuit comprises an endless loop including the series-connected current transformers CT1, CT2, CT3 and CT4 linked with corresponding phase conductors of the respective alternators and, connected across the current transformer windings, the primaries of voltage regulator equalizer transformers ET1, ET2, ET3 and ET4, respectively. The control voltage applied to each individual voltage regulator by its equalizer transformer is proportional to the difference between the current in the associated alternator phase conductor linked by its current transformer and the corresponding mean current of all the alternators in the system, assuming a substantially balanced load condition, which is the usual case.

In the event the bus tie breaker of a particular alternator is tripped, a set of contacts (shown in Figure 2) in the bus tie breaker is closed and the current transformer and equalizer transformer associated with the particular alternator are by-passed thereby so that the operation of such alternator as an isolated power supply unit does not disturb or influence the remaining alternators continuing to operate as a unitary system.

The details of construction and operation of a multiple-alternator system such as that just briefly described in connection with Figure 1 are well known and need no further explanation herein. Such a system is subject to the short-comings previously set forth in the event of certain faul conditions that may occur and for which heretofore no adequate protection has been provided. The present invention deals with protective apparatus supplying the desired additional protection in a system of this type or to any equivalent system to which the principles involved are applicable, as will be evident to those skilled in the electrical art involved herein.

Figure 2:
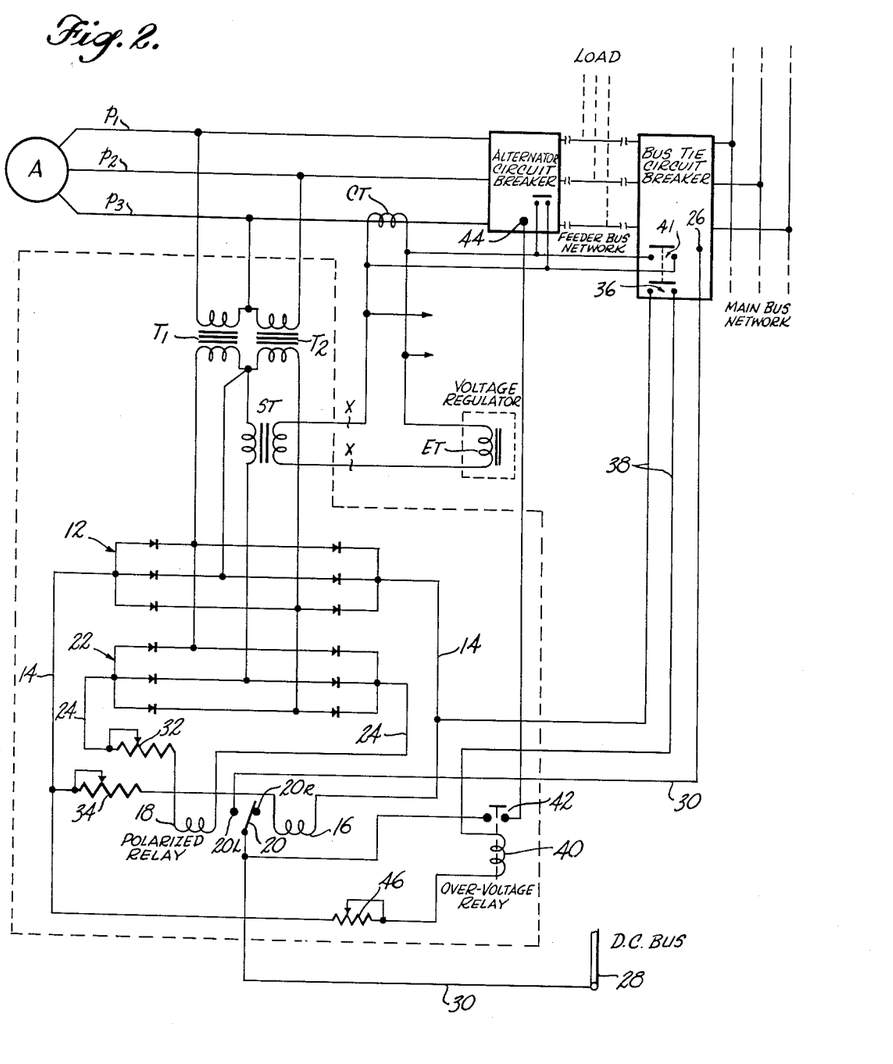
Figure 2 is a schematic diagram of a section or unit of the protective apparatus associated with an individual alternator.

In Figure 2 one of the alternators appears in association with certain of the system components immediately identified with it, together with the associated section or unit of the protective apparaus. A similar unit of protective control equipment is provided for each alternator in the system, with the several units thereof being coordinated by interconnections to be described. In Figure 2, the primaries of two similar transformers T1 and T2 are connected to the three alternator phase conductors p1, p2, and p3 to provide a three-phase voltage at the interconnected secondary windings of these transformers. This three-phase secondary voltage is applied directly to a first three-phase full-wave rectifier bank 12 which converts such voltage into a proportional direct current passed by conductor 14 through one control winding 16 of the polarized relay. The polarized relay, so designated in the figure, includes a second control winding 18, the effect of which is balanced against that of the winding 16 in order to control the position of the relay switch arm 20. The polarized relay control coil 18 is energized by rectified current from the three-phase full-wave rectifier bank 22 similar to the rectifier bank 12, such current flowing through the circuit conductor 24. The rectifier bank 22 is impressed with the three-phase voltage of the transformers T1 and T2, to one phase (the third or common connection phase) of which is added, vectorially, the secondary voltage of the sensing transformer ST. As previously mentioned, the primary winding of this sensing transformer is connected in the equalizer circuit of the system, that is, directly in series with the primary winding of the voltage regulator equalizer transformer ET such that the primaries of these two transformers are connected in series across the related current transformer CT. The circuit points X—X identified in Figure 1, and correspondingly indicated in Figure 2, show the manner in which the several sensing transformer primaries in the complete protective system are interposed in the existing equalizer loop of the basic power system depicted in Figure 1.

As previously mentioned, a voltage component produced by each sensing transformer in the equalizer loop is proportional to the difference between the current carried by the particular alternator and the mean current of all the alternators in the system. The addition of this differential current voltage to the three-phase voltage applied to the rectifier bank 22 obviously affects the balance between the opposed control coils 16 and 18 acting on relay arm 20. If relay coil 16 predominates, as in normal operation of the system, switch arm 20 is held against the dead contact 20R; on the other hand occurrence of a fault or abnormality producing excessive lagging reactive current in the particular alternator, causes the effect of control coil 18 to overbalance that of coil 16 and moves switch arm 20 against contact 20L.

Figure 3:
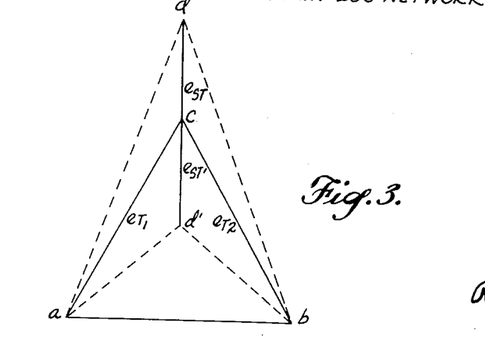
Figure 3 is a vector diagram illustrating the principle of operation of the protective apparatus of Figure 2 with respect to lagging reactive current.

Thus, in the vector diagram of Figure 3 the triangle a, b, c represents the vectorial relationship of the three-phase voltage produced by the interconnected secondary windings of transformers T1 and T2 as applied to the rectifier bank 12 in Figure 2. The vector eT1 represents the voltage of transformer T1, while eT2 represents that of T2. When the secondary voltage of sensing transformer ST is added vectorially to their common potential point for application to the other rectifier bank 22 the resultant three-phase vector diagram is represented by the triangle a, b, d, the apex d of which is located on a line passing through the apex c of the other vector triangle and shifts along this line with variations in the voltage eST from the secondary of transformer ST.

With the particular phase connections illustrated in Figure 2, and assuming that there is a 90° phase angle between the primary current and secondary voltage of transformer ST, a somewhat idealized assumption yet proper for explanatory purposes, the line d—d' along which the apex of the modified three-phase voltage triangle shifts is perpendicular to the base line a—b common to both triangles. If the particular alternator delivers more than its share of lagging reactive current in the system the vector eST will lie outside triangle a, b, c to produce a resultant vector triangle a, b, d, which is larger than triangle a, b, c, and the polarized relay control coil 18 will overbalance the coil 16, shifting the relay arm 20 into engagement with contact 20L and thereby forming a tripping circuit for the bus tie circuit breaker of the particular alternator. The relay arm 20 and contact 20L connect the bus tie circuit breaker tripping coil terminal 26 to a suitable D. C. supply source 28 through conductor 30, as shown. If, on the other hand, the particular alternator is delivering less than its share of reactive current in the system, the vector eST' will lie inside the triangle a, b, c and the resultant vector triangle a, b, d' will be smaller than triangle a, b, c, so that the normal predominance of the control coil 16 will not be disturbed by the accompanying energization of coil 18.

The somewhat idealized vector diagram of Figure 3 is based upon the assumption that the voltages eT1 and eT2 remain substantially constant throughout the variations of eST. Actually the voltages eT1 and eT2 may vary in case of abnormal operating conditions, but if they do so, the effect upon the voltage comparison circuit comprising the two rectifier banks and the associated polarized relay control coils will be about equal so that the control action resulting in tripping of the bus tie circuit breaker remains substantially the same as that just described. It will also be appreciated that the polarized relay control coils may be reversed in circuit position if the polarity of the sensing transformer is reversed. In other words the circuit may be made responsive to a decreasing voltage vector triangle a, b, d instead of to an increasing one if desired.

In order to adjust the magnitudes of the currents in the two polarized relay control coils 16 and 18 at desired operating values, and in order to establish the degree of reactive overload of the alternator at which control coil 18 overbalances control coil 16, a variable resistor 32 is interposed in the energizing circuit of coil 18 and a similar resistor 34 in that of coil 16, as shown.

The bus tie circuit breaker for each alternator includes or controls a switch 36 which is open during normal operation. This switch is interposed in the conductor 38 by which energizing current from rectifier bank 12 is passed through the coil 40 of an over-voltage relay (so designated in Figure 2), as shown. Since this switch is normally open, the over-voltage relay coil of the particular alternator is isolated until a system abnormality occurs which trips the bus tie breaker and thereby closes the switch 36. Thereafter, if the alternator voltage rises above the critical value of the over-voltage relay the latter closes its contacts 42 and applies tripping voltage from energized conductor 30 to the tripping coil terminal 44 of the individual alternator's circuit breaker, as desired. A variable resistor 46 in series with the over-voltage relay coil 40 may be adjusted to vary the alternator over-voltage at which this relay trips the alternator circuit breaker.

Load transfer relay means (not shown) is preferably included in the overall system and operates whenever both the bus tie breaker and the individual alternator breaker of a particular alternator have been tripped out. When this happens the section of load previously served by that alternator is completely without power. The load transfer relay means, sensitive to the drop of voltage at the load terminals, automatically connects such load to one of the other bus networks in the system and thereby restores power to the impaired section of load as desired.

When the bus tie circuit breaker has been tripped by reason of reactive current overload of the particular alternator, a second normally open switch 41 included in or controlled by the bue tie circuit breaker forms a short circuit around the current transformer CT of the particular alternator and thereby enables the remaining three alternators to operate in a regulated system of reduced size as long as normal operating conditions otherwise prevail therein.

In the vector diagram of Figure 3 the phase angle of voltage eST is assumed to be at 90° to the vector line a—b. Upon that assumption the phase angle, in the same vector diagram, of a voltage vector representing real or unity power factor current in conductor p3 is therefore parallel to the base line a—b. Hence amplitude variations in the vector representing the difference between alternator real current and the average real current in all the alternators in the system produce no change in area of the vector triangle (not shown) which would represent the vectorial addition of such vector to triangle *a, b, c*. In other words, upon the assumption mentioned just above, real current variations have no appreciable effect upon the polarized relay in the particular form of protective circuit illustrated in Figure 2. Such protective apparatus responds selectively to reactive current overload.

There is actually some phase shift, however, in transformer ST such that in a typical practical device the phase angle between voltage vector line *d—d'* and vector triangle base line *a—b* is more nearly 75° than 90°. This phase angle discrepancy does not impair the operation of the apparatus in Figure 2 for the purpose described, however, but does form the basis for the modified arrangement shown in Figure 4. In the arrangement illustrated in the latter figure certain phase connections of the circuit are switched around from what they were in Figure 2 so that the apparatus then responds not only to reactive current overload of the particular alternator but also to the condition, such as might be caused by failure of the associated prime mover, wherein the alternator delivers much less than its proper share of real current in the system.

Figures 4, 5, 6:
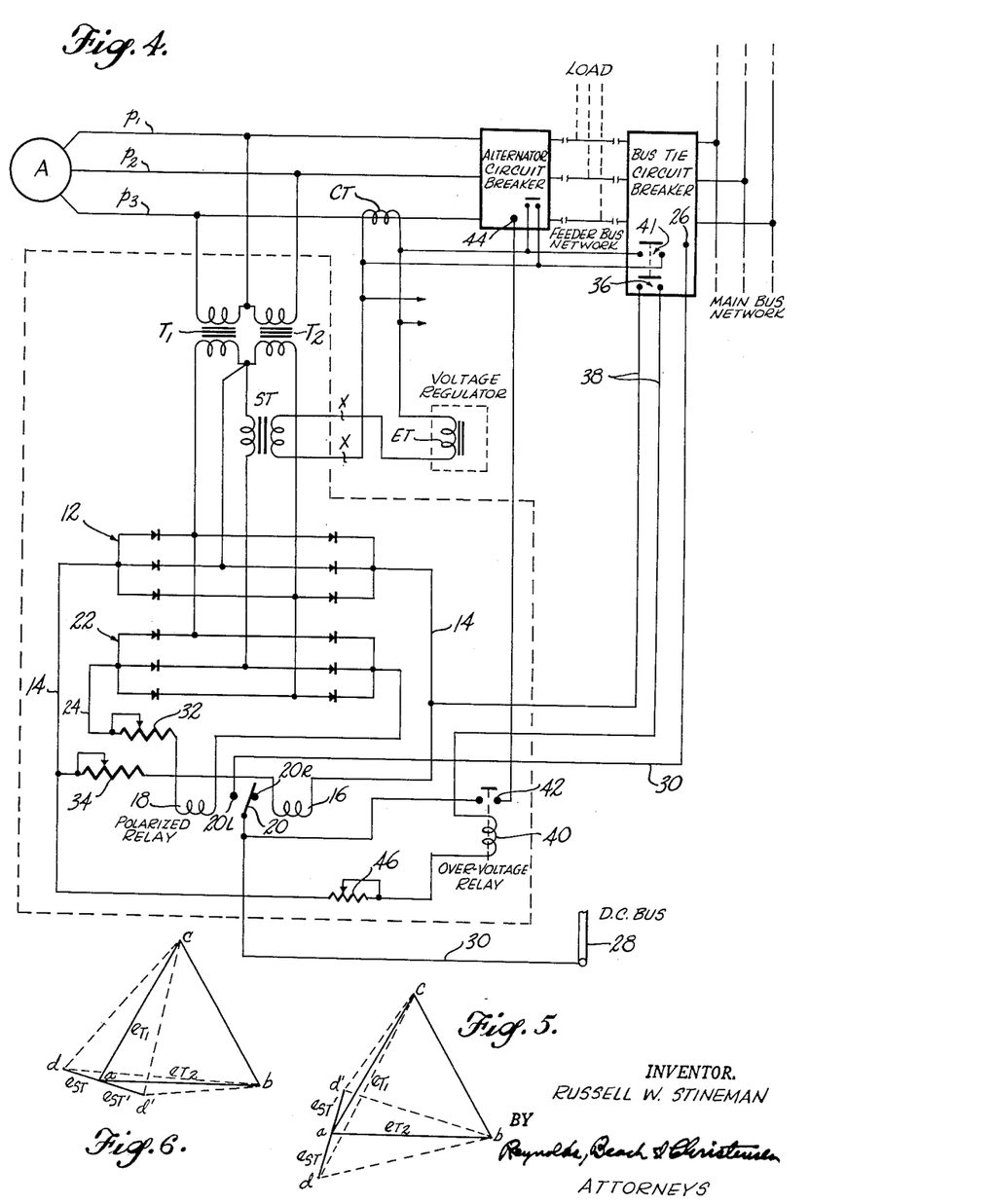
Figure 4 is a schematic diagram similar to Figure 2 in which certain connections of the protective apparatus are reversed to achieve a modified protective control operation.
Figure 5 is a vector diagram illustrating the operation of the apparatus in Figure 4 with respect to lagging reactive current.
Figure 6 is a vector diagram illustrating the operation of the apparatus in Figure 4 with respect to the condition of the particular alternator delivering less than its share of real current.

In Figure 4 the connections of the primary terminals of transformers T1 and T2 with the individual phase conductors *p1, p2* and *p3* of the particular alternator are in the reverse phase sequence from what they were in Figure 2 and the primary winding polarity of transformer ST is reversed. The effect of these changes in terms of the controlling influence of the sensing transformer ST on the action of the polarized relay is illustrated in the vector diagrams of Figures 5 and 6. In these two figures the same symbols are used to designate the different voltage vectors involved as the symbols used in Figure 3.

Figure 5 illustrates the action in respect to lagging reactive current in the particular alternator. If the alternator delivers less than its share of lagging reactive current, the secondary voltage of transformer ST is represented by vector *eST'* and the energization of polarized relay control coil 18 is insufficient to overbalance the effect of coil 16 holding the arm 20 in normal position. However, as in the previous form, an increase of reactive current in the particular alternator above the average reactive current of all the alternators produces a vector *eST* which, if sufficiently great, results in actuation of the polarized relay to trip out the alternator bus tie circuit breaker. The protective action of the arrangement shown in Figure 4 is therefore similar to that of Figure 2 in respect to any alternator producing materially more than its share of lagging reactive current.

However, the apparatus of Figure 4 is additionally operable to trip out the bus tie circuit breaker in the event the particular alternator delivers materially less than its share of real current, symptomatic of failure of the prime mover of the particular alternator. Figure 6 illustrates the action in terms of vector voltages. In this figure, the vector *eST'* represents the secondary voltage of sensing transformer ST in the event the alternator delivers more than its share of real current. In this event the vector triangle *b, c, d'* is smaller than the normal or base triangle *a, b, c* and the energization of polarized relay coil 18 is less than that of coil 16. However, when the reverse condition occurs, the vector *eST* produces a vector triangle *b, c, d* which is larger than the base triangle *a, b, c*; and if the former becomes sufficiently large, depending upon voltage comparison circuit adjustments, the polarized relay operates to trip out the bus tie breaker and isolate the impaired alternator from the remainder of the system. The variable resistors 32 and 34 are, of course, adjusted relatively so that normal variations in the difference between real currents of the alternators merely the result of normal speed-load characteristics of their respective prime movers cannot result in tripping out the bus tie breakers.

By making still other rearrangements of the control voltage connections for the voltage comparison circuit in the apparatus, it is possible to detect any combination of abnormal or subnormal real or reactive currents in the different alternators. However, the two arrangements herein illustrated are presently regarded as most useful in practical applications wherein the described protective control problems exist.

The inclusion of the over-voltage relay in each unit of protective apparatus, with an adjusting resistor connected in series therewith, obviates a separate over-voltage relay apparatus and thereby further conserves space, weight and cost. The saving, in part, includes an additional set of rectifiers and transformers, and is therefore another distinct advantage of the improved apparatus in which certain components serve in multiple duty capacity.

I claim as my invention:

1. In a multiple-alternator power generating and distribution system generally of the type including separate feeder bus networks for the individual alternators, separate alternator breakers arranged for connecting such feeder bus networks to their respective alternators, a main bus network for the system, separate alternator bus tie breakers arranged for connecting their respective alternator feeder bus networks to such main bus network, separate alternator voltage regulators operatively connected to their respective alternators, and equalizer circuit means having therein a plurality of separate alternator current transformers connected together in series and individually arranged to be energized by current flow in their respective alternators, said current transformers being operatively connected to the voltage regulators for their respective alternators in a manner tending to equalize reactive current in such alternators; the combination with said alternators, said current transformers and said bus tie breakers of protective apparatus comprising separate alternator output detecting means individually connected for energization by their respective alternators and having further connections for energization by their respective current transformers, whereby said detecting means respond selectively to lagging reactive current in their respective alternators materially in excess of the average reactive current in all the alternators, and separate tripping means for each of said bus tie breakers, said tripping means being connected to their respective alternator detecting means and being operated automatically by the selective responses thereof for tripping out the bus tie breaker of any such alternator delivering materially more than said average of lagging reactive current.

2. The combination defined in claim 1, wherein the individual detecting means comprise two separately energized circuit means, one such circuit means being connected for energization substantially solely by alternating output voltage of the related alternator, and the other such circuit means being connected for energization substantially solely by such alternating output voltage combined in a vectorial sense with alternating voltage derived from the related current transformer, and energizable means operatively connected to the tripping means and having electrically conductive elements therein each connected to one of the circuit means to be energized by said circuit means, respectively, said energizable means being arranged to respond selectively to a predetermined unbalance in the flow of current in said conductive elements corresponding to the condition of excessive lagging reactive current in the related alternator and thereby operate said tripping means.

3. The combination defined in claim 2, wherein the two separately energized circuit means comprise similar rectifier means to which the respective alternating voltages are applied, and the energizable means comprises polarized relay means having mutually opposed coils comprising the conductive elements of the energizable means connected for energization through said rectifier means, respectively.

4. The method of protecting a power generating and distribution system of the type including a plurality of separately driven alternators electrically interconnected in parallel, voltage regulators controlling the output voltage of the respective alternators by controlling the excitation thereof, and equalizer circuit means interconnecting the voltage regulators and tending to equalize the reactive current of each alternator with the average of all the alternators, said method of protection comprising the steps of continuously detecting the respective amounts of difference between lagging reactive current of each of said individual alternators and the average lagging reactive current of all the alternators, and disconnecting any individual alternator from the remaining alternators when lagging reactive current of said individual alternator exceeds the average for all the alternators by a predetermined amount.

5. The method of protecting a power generating and distribution system of the type including a plurality of separately driven alternators electrically interconnected in parallel, feeder bus networks connected to each of said alternators, respectively, a main bus network connected to said feeder bus networks, voltage regulators controlling the output voltage of the respective alternators by controlling the excitation thereof, and equalizer circuit means interconnecting the voltage regulators and tending to equalize the reactive current of each alternator with the average of all the alternators, said method of protection comprising the steps of continuously detecting the respective amounts of difference between lagging reactive current of each of said individual alternators and the average lagging reactive current of all the alternators, and disconnecting any individual alternator and its feeder bus network from the main bus network when lagging reactive current of said individual alternator exceeds the average for all the alternators by a predetermined amount.

6. The system of protection for voltage-regulated power generating and distribution systems including a plurality of separately driven alternators and, a common bus circuit energizable by said alternators, and a plurality of circuit breaker means normally connecting the respective alternators to said common bus circuit, said circuit breaker means being individually operable to disconnect their respective alternators from said common bus circuit; said protection system comprising the combination with said alternators and said circuit breaker means of a plurality of detecting circuit means individual to the respective alternators, including differential current sensing means individually connected for energization by current flow in and by current flow in all of their respective alternators and by current flow in all of the alternators, said respective sensing means producing individual responses to such energization thereof selectively proportional to the respective differences between lagging reactive current in their related alternators and the average of lagging reactive currents in all of the alternators, and operating circuit means connected between the respective current sensing means and the related alternator circuit breaker means, said operating circuit means being respectively controlled by said individual responses for automatically operating the circuit breaker means of any such alternator whose lagging reactive current materially exceeds said average.

7. The protective system defined in claim 6, wherein the detecting circuit current sensing means of each alternator comprises the secondary of sensing transformer means having a primary connected in a series loop with the primaries of the similar sensing transformer means of the other alternators, and a current transformer arranged to be energized by current flow in one phase conductor of the particular alternator and connected across the primary of the transformer means of such alternator.

8. The protective system defined in claim 7, wherein the detecting circuit current sensing means of each alternator comprises two branches, one such branch being connected for energization by output voltage of the particular alternator added to voltage of the related sensing transformer secondary, and the second of such branches being connected for energization by such alternator voltage alone, and the individual operating circuit means include means balancing the resultant voltages in said two branches against each other for controlling circuit breaker operation.

9. The protective system defined in claim 8, wherein the balancing means of each operating circuit means comprises a polarized relay having opposed control coils connected for energization respectively by the resultant voltages of the branches of said detecting circuit current sensing means.

10. The protective system defined in claim 9, wherein the alternators produce three-phase voltage and the individual operating circuit means further comprise separate three-phase rectifier banks in the two branches thereof connected to the polarized relay control coils, respectively.

11. The combination defined in claim 8, additionally comprising a plurality of individual alternator feeder bus networks interconnecting the circuit breaker means and the related alternators, respectively, a plurality of individual alternator breakers normally connecting each of the alternators with their respective feeder bus networks and operable to disconnect such feeder bus networks therefrom, respectively, a plurality of over-voltage relay means connected for operating the individual alternator breakers by energization of such relay means, respectively, each of said over-voltage relay means having a normally open energizing circuit connected for energizing such over-voltage relay by output voltage of the related alternator, switch means in each such energizing circuit and arranged for actuation to complete such circuit automatically by operation of the corresponding first-mentioned circuit breaker means of the particular alternator, said relay means responding to energizing voltage corresponding to alternator output voltage above a predetermined value and thereby operating the related individual alternator breaker.

12. The combination defined in claim 11, wherein the energizing circuit of each over-voltage relay is connected to the second named branch of the related detecting circuit current sensing means.

13. The protective system defined in claim 6, wherein the individual current sensing means are operatively connected for additionally producing individual responses to energization thereof selectively proportional to the respective differences between real current of the related alternators and average real current of all the alternators, the respective operating circuit means being further controlled by said latter responses respectively for automatically operating the circuit breaker means of any alternator whose real current drops materially below the effective average of all the alternators.

14. The protective system defined in claim 13, wherein the detecting circuit current sensing means of each alternator comprises the secondary of sensing transformer means having a primary connected in a series loop with the primaries of the similar sensing transformer means of the other alternators, a current transformer arranged to be energized by current flow in one phase conductor of the particular alternator and connected across the primary of the transformer means of such alternator.

15. The protective system defined in claim 14, wherein the detecting circuit current sensing means of each alternator comprises two branches, one such branch being connected for energization by output voltage of the particular alternator added to voltage of the related sensing transformer secondary, and the second of such branches being connected for energization by such alternator voltage alone, and the operating circuit means of each such detecting circuit means include means balancing the resultant voltages in said two current sensing means branches against each other for controlling circuit breaker operation.

16. The protective system defined in claim 15, wherein the balancing means of each detecting circuit current sensing means comprises a polarized relay having opposed control coils connected for energization respectively by the resultant voltages of the branches of said detecting circuit current sensing means.

17. The protective system defined in claim 16, wherein the alternators produce three-phase voltage and the operating circuit means of each detecting circuit means further comprise separate three-phase rectifier banks in the two current sensing means branches thereof connected to the polarized relay control coils, respectively.

18. In a multiple-alternator power generating and distribution system generally of the type including separate feeder bus networks for the individual alternators, separate alternator breakers arranged for connecting such feeder bus networks to their respective alternators, a main bus network for the system, separate alternator bus tie breakers arranged for connecting their respective alternator feeder bus networks to such main bus network, separate alternator voltage regulators operatively connected to their respective alternators, and equalizer circuit means having therein a plurality of separate alternator current transformers connected together in series and individually arranged to be energized by current flow in their respective alternators, said current transformers being operatively connected to the voltage regulators for their respective alternators in a manner tending to equalize reactive current in such alternators; the combination with said alternators, said equalizer circuit and current transformers therein, and said bus tie breakers of protective apparatus comprising a plurality of similar units operatively connected to the respective alternators, each such unit including a voltage comparison circuit having two branches therein each connected to be energized by alternator voltage and each including a separate rectifier bank, a polarized relay having opposed coils individually connected to be energized by one of the respective rectifier banks, and a sensing transformer having a secondary connected in one of said voltage comparison circuit branches for adding its voltage to the alternator voltage in such branch, and a primary connected in the equalizer circuit across the current transformer therein related to the particular alternator, said polarized relay being connected to the bus tie breaker of the particular alternator for operating such breaker in response to unbalance in the energization of the opposing polarized relay coils inherently resulting from lagging reactive current in the particular alternator materially above the effective average of all the alternators.

19. In a multiple-alternator power generating and distribution system generally of the type including separate feeder bus networks for the individual alternators, separate alternator breakers arranged for connecting such feeder bus networks to their respective alternators, a main bus network for the system, separate alternator bus tie breakers arranged for connecting their respective alternator feeder bus networks to such main bus network, separate alternator voltage regulators operatively connected to their respective alternators, and equalizer circuit means having therein a plurality of separate alternator current transformers connected together in series and individually arranged to be energized by current flow in their respective alternators, said current transformers being operatively connected to the voltage regulators for their respective alternators in a manner tending to equalize reactive current in such alternators; the combination with said alternators, said equalizer circuit and current transformers therein, and said bus tie breakers of protective apparatus comprising a plurality of similar units operatively connected to the respective alternators, each such unit including a voltage comparison circuit having two branches therein each connected to be energized by alternator voltage and each including a separate rectifier bank, a polarized relay having opposed coils individually connected to be energized by one of the respective rectifier banks, respectively, and a sensing transformer having a secondary connected in one of said voltage comparison circuit branches for adding its voltage to the alternator voltage in such branch, and a primary connected in the equalizer circuit across the current transformer therein related to the particular alternator, said polarized relay being connected to the bus tie breaker of the particular alternator for operating such breaker in response to material unbalance in the energization of the opposing polarized relay coils in a particular sense, the polarity of connections of said sensing transformer being such that such relay coil unbalance of energization inherently results from lagging reactive current in the particular alternator materially above the effective average of all the alternators and alternatively from real current in the particular alternator materially below the effective average of all the alternators.

20. In a multiple three-phase alternator power generating and distribution system generally of the type including separate alternator feeder bus networks, individual alternator breakers normally connecting such feeder bus networks to the respective alternators, a main bus network, bus tie breakers normally connecting such main bus network to the respective feeder bus networks, voltage regulators controlling the respective alternators, and equalizer circuit means having therein a series of current transformers energized by the respective alternators and energizingly connected to the voltage regulators of said alternators in a manner tending to equalize reactive current in the different alternators; the combination with said alternators, said equalizer circuit and current transformers therein, and said bus tie breakers of protective apparatus comprising a plurality of similar units operatively associated with the respective alternators, each such unit comprising a voltage comparison circuit having two branches, each branch including a separate three-phase rectifier bank therein, energizing means connected for energization by three-phase voltage of the related alternator and having three conductors connected for applying three-phase voltage to both of said rectifier banks related both in phase and in amplitude to such alternator voltage, sensing transformer means having a primary winding connected in the equalizer circuit across the particular alternator's equalizer circuit current transformer and a secondary winding interposed in series with one of said three conductors at a location therein whereby the voltage of said secondary winding is applied to but one of said rectifier banks thereby to vary the rectified output of such bank relative to the other bank in accordance with the difference between lagging reactive current of the particular alternator and the effective average of all the alternators, and balancing means energized by both of said rectifier banks, said latter means being connected to the bus tie breaker of the particular alternator and being arranged to operate such breaker automatically in response to material unbalance in one direction between such outputs, corresponding to materially above-average lagging reactive current in the particular alternator.

21. The combination defined in claim 20, wherein the phase connections of the sensing transformer are such that materially above-average lagging reactive current and alternatively materially below-average real current in the particular alternator produce substantially similar unbalance in the same sense in the balancing means for tripping out the bus tie breaker of such alternator.

22. The method of protecting a power generating and distribution system including a plurality of separately driven alternators electrically interconnected in parallel, voltage regulators controlling the output voltage of the respective alternators by controlling the excitation thereof and equalizer circuit means interconnecting the voltage regulators and tending to equalize the reactive current of each alternator with the average of all the alternators, said method of protection comprising the steps of continuously detecting the respective amounts of difference between real current of each of said individual alternators and the average real current of all the alternators, and disconnecting any individual alternator from the remaining alternators when real current of said individual alternator falls materially below the average for all the alternators.

23. The method defined in claim 22, comprising the additional steps of continuously detecting the respective amounts of difference between lagging reactive current of each of said individual alternators and the average lagging reactive current of all the alternators, and disconnecting any individual alternator from the remaining alternators when lagging reactive current of said individual alternator exceeds the average for all the alternators by a predetermined amount.

References Cited in the file of this patent
UNITED STATES PATENTS

| | | |
|---|---|---|
| 2,590,265 | Miner et al. | Mar. 25, 1952 |
| 2,636,132 | Stineman et al. | Apr. 21, 1953 |